(12) United States Patent
Hara et al.

(10) Patent No.: US 10,583,934 B2
(45) Date of Patent: Mar. 10, 2020

(54) FUEL PIPE OF AIRCRAFT AND AIRCRAFT

(71) Applicant: MITSUBISHI AIRCRAFT CORPORATION, Aichi (JP)

(72) Inventors: Nobuhide Hara, Tokyo (JP); Ushio Komoda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 484 days.

(21) Appl. No.: 15/438,928

(22) Filed: Feb. 22, 2017

(65) Prior Publication Data
US 2017/0267368 A1 Sep. 21, 2017

(30) Foreign Application Priority Data
Mar. 16, 2016 (JP) .................. 2016-051912

(51) Int. Cl.
*B65D 37/00* (2006.01)
*F16L 9/18* (2006.01)
*B64C 1/14* (2006.01)
*B64D 37/00* (2006.01)
*B64D 41/00* (2006.01)

(52) U.S. Cl.
CPC .......... *B64D 37/005* (2013.01); *B64C 1/1453* (2013.01); *B64D 41/00* (2013.01); *F16L 9/18* (2013.01); *F16L 2201/30* (2013.01)

(58) Field of Classification Search
CPC .... B64D 37/005; B64D 37/04; B64C 1/1453; F16L 9/18

USPC ......................................... 138/112–114, 148
See application file for complete search history.

(56) References Cited

U.S. PATENT DOCUMENTS

| 4,274,549 A * | 6/1981 | Germain .............. | B60K 15/035 138/113 |
| 2012/0104172 A1* | 5/2012 | Haug ................... | B64D 37/005 244/135 R |
| 2015/0246732 A1 | 9/2015 | Kawano et al. | |
| 2015/0314858 A1* | 11/2015 | Leachman ............ | B64C 1/1453 137/899.2 |
| 2016/0167801 A1* | 6/2016 | Haskins ................ | B64D 37/34 60/772 |

FOREIGN PATENT DOCUMENTS

JP 2015172368 A 10/2015

* cited by examiner

*Primary Examiner* — Nicholas McFall
(74) *Attorney, Agent, or Firm* — Pearne & Gordon LLP (57) ABSTRACT

To provide a fuel pipe of an aircraft that makes it possible to maintain temperature of fuel in the fuel pipe at appropriate temperature while giving consideration to reliability that is constantly required for the aircraft. A fuel pipe provided in an airframe of the aircraft includes: an inner pipe defining a flow path through which fuel flows; and an outer pipe surrounding an outer periphery of the inner pipe. A gap is provided between the outer periphery of the inner pipe and an inner periphery of the outer pipe. The inner pipe is made of a rubber material, and the outer pipe is made of a metal material.

14 Claims, 6 Drawing Sheets

FUEL PIPE OF AIRCRAFT AND AIRCRAFT

BACKGROUND OF THE INVENTION

Field of the Invention

The present invention relates to a fuel pipe of an aircraft, and to an aircraft including the fuel pipe.

Description of the Related Art

Fuel of an aircraft is supplied from a storage space inside a main wing to an engine and an auxiliary power unit through a fuel pipe (for example, Japanese Patent Laid-Open No. 2015-172368).

The fuel pipe is typically made of an aluminum alloy, as with members frequently used in an aircraft in terms of weight.

The fuel pipe that supplies the fuel to the auxiliary power unit mounted on a rear end of a fuselage is arranged from a trailing edge of the main wing to the auxiliary power unit through inside of the fuselage.

The fuel pipe is arranged not only in a pressurized section in which air conditioning is performed with use of bleed air from an engine, but also in a non-pressurized section. When the air in the non-pressurized section is cooled by cold outside air at higher altitudes, the temperature of the fuel in the fuel pipe that passes through the non-pressurized section is lowered. Typically, management of fuel temperature is also necessary to secure required performance of the power unit using the fuel.

An object of the present invention is to provide a fuel pipe of an aircraft that makes it possible to maintain temperature of the fuel in the fuel pipe at appropriate temperature while giving consideration to reliability that is constantly required for the aircraft, and to provide an aircraft including the fuel pipe.

SUMMARY OF THE INVENTION

A fuel pipe provided in an airframe of an aircraft according to the present invention, includes: an inner pipe defining a flow path through which fuel flows, the inner pipe being made of a rubber material; and an outer pipe surrounding an outer periphery of the inner pipe, the outer pipe being made of a metal material, in which a gap is provided between the outer periphery of the inner pipe and an inner periphery of the outer pipe.

The fuel pipe according to the present invention makes it possible to supply the fuel inside the main wing to a fuel supply destination that is mounted on a rear part of the airframe.

The fuel pipe according to the present invention may preferably include the inner pipe and the outer pipe over substantially an entire length.

In addition, a fuel pipe provided in an airframe of an aircraft according to the present invention, includes: an inner pipe defining a flow path through which fuel flows; and an outer pipe surrounding an outer periphery of the inner pipe, in which a gap is provided between the outer periphery of the inner pipe and an inner periphery of the outer pipe, and the gap is continuous in a length direction of the fuel pipe and communicates with inside of a drain pipe that discharges the fuel to outside of the aircraft.

Even if the fuel is leaked to the gap between the inner pipe and the outer pipe of the fuel pipe, it is possible to discharge the leaked fuel to the outside of the aircraft through the drain pipe without retaining the leaked fuel in the gap.

In the fuel pipe according to the present invention, the drain pipe may preferably include a discharge part that discharges the fuel rearward outside the aircraft.

In the fuel pipe according to the present invention, the discharge part may preferably include a discharge path through which the fuel flows, and an aerodynamic fairing that covers the discharge path.

In the fuel pipe according to the present invention, the discharge path and the aerodynamic fairing may preferably wholly project, in a ventral fin shape, from a lower part of the airframe to the outside of the aircraft.

In the fuel pipe according to the present invention, a bent part of the drain pipe and a vicinity of the bent part may be preferably made of a rubber material.

In the fuel pipe according to the present invention, an annular member may be preferably provided between the outer periphery of the inner pipe and the inner periphery of the outer pipe. The annular member may maintain a predetermined size of the gap and allow passage of the fuel.

In addition, a fuel pipe provided in an airframe of an aircraft according to the present invention, includes: an inner pipe defining a flow path through which fuel flows, the inner pipe being made of a rubber material; and an outer pipe surrounding an outer periphery of the inner pipe, the outer pipe being made of a metal material, in which a gap is provided between the outer periphery of the inner pipe and an inner periphery of the outer pipe, and the gap is continuous in a length direction of the fuel pipe and communicates with inside of a drain pipe that discharges the fuel to outside of the aircraft.

An aircraft according to the present invention includes any of the above-described fuel pipes and a fuel supply destination supplied with fuel through the fuel pipe.

According to the present invention, it is possible to suppress temperature decrease of the fuel in the inner pipe by heat insulation effect by the inner pipe made of the rubber material and the heat insulation effect by the gap between the inner pipe and the outer pipe even if the airframe is exposed to the outside air below freezing during flight at higher altitudes. In this case, the former heat insulation effect is dominant and the latter heat insulation effect is additional. According to the present invention, the above-described heat insulation effects make it possible to suppress coagulation of moisture in the fuel and icing on the inner wall of the inner pipe.

In addition, even if impact is applied to the fuel pipe, the outer pipe made of the metal material is deformed and broken so as to partially absorb energy of the impact, and the inner pipe made of the rubber material is avoided from being broken although being deformed, which makes it possible to retain the fuel in the inner pipe.

DETAILED DESCRIPTION OF THE PREFERRED EMBODIMENT

An embodiment of an aircraft that includes a fuel pipe and a fuel supply destination according to the present invention is described below with reference to accompanying drawings.

Figure 1:
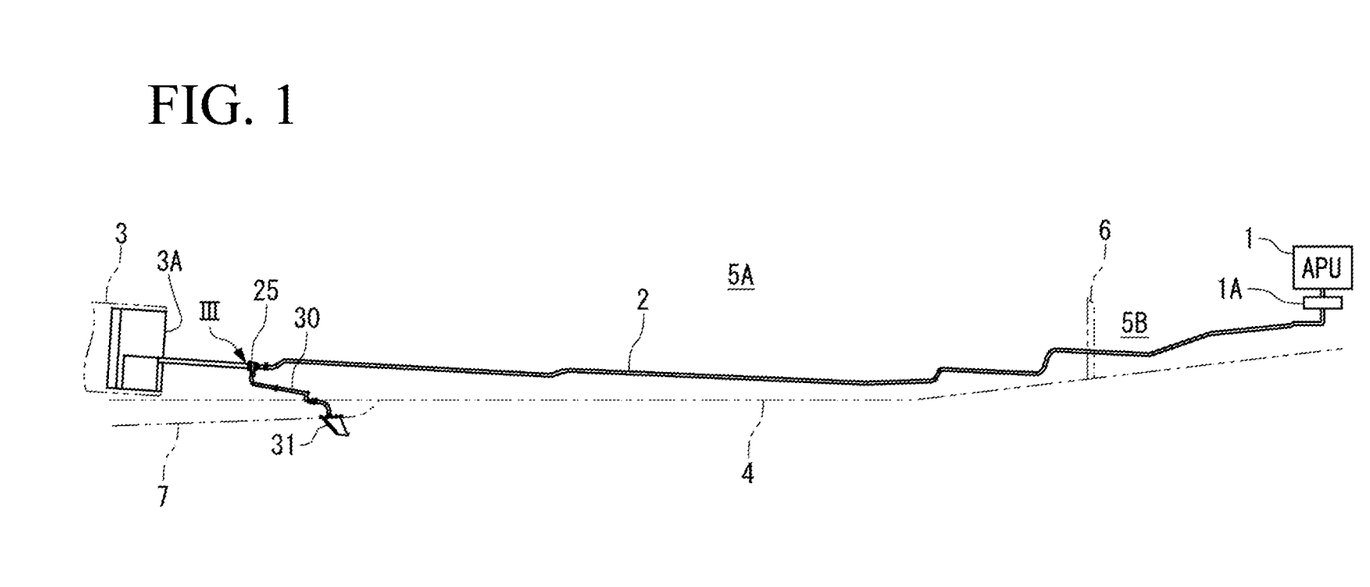
FIG. 1 is a diagram illustrating a fuel pipe of an aircraft according to an embodiment of the present invention.

FIG. 1 is a diagram illustrating a fuel pipe 2 that supplies fuel of an aircraft to an auxiliary power unit (APU) 1. The fuel of the aircraft is stored inside a main wing 3, and an unillustrated fuel pump forcibly feeds the fuel to the auxiliary power unit 1 through the fuel pipe 2.

A rear spar 3A that configures a rear edge part of the main wing 3 is illustrated in FIG. 1. In addition, a contour of a lower end part of a fuselage 4 is illustrated by an alternate long and two short dashes line.

The auxiliary power unit 1 is mounted on an unillustrated tail cone that configures a rear end of the fuselage 4. The auxiliary power unit 1 operates when engine trouble occurs during flight, in addition to in parking.

The lower end part of the fuselage 4 is so formed as to head gradually upward toward the rear end of the fuselage 4.

In the present specification, "front" and "rear" follow "front" and "rear" in a traveling direction of the aircraft during flight.

Further, in the present specification, "upper" and "lower" follow "upper" and "lower" in a vertical direction of the aircraft in parking or during cruise.

The fuel pipe 2 passes through sections along the rear spar 3A into inside of the fuselage 4, then passes through the inside of the fuselage 4 to the rear side and heads gradually upward toward the rear side, and finally reaches the auxiliary power unit 1. The auxiliary power unit 1 includes, as an accessary, a heat exchanger 1A that warms the fuel.

The fuel fed through the fuel pipe 2 is supplied to a fuel receiving port of the auxiliary power unit 1 through the heat exchanger 1A.

As illustrated by arrow III in FIG. 1, a drain pipe 30 is provided at a drain connection site 25 that is the lowest site of the fuel pipe 2 extending from the rear spar 3A toward the auxiliary power unit 1. The drain connection site 25 is the lowest site in the aircraft in parking or during cruise. The drain connection site 25 is separated rearward from the rear spar 3A of the main wing 3.

The fuel pipe 2 is arranged in a pressurized section 5A and a non-pressurized section 5B that are set in the aircraft. The pressurized section 5A including a cabin, a cargo compartment, and the like is controlled in pressure, temperature, humidity, and the like, with use of bleed air provided from an unillustrated engine. The fuel pipe 2 penetrates through a pressure bulkhead 6 that separates the pressurized section 5A from the non-pressurized section 5B.

Figure 4:
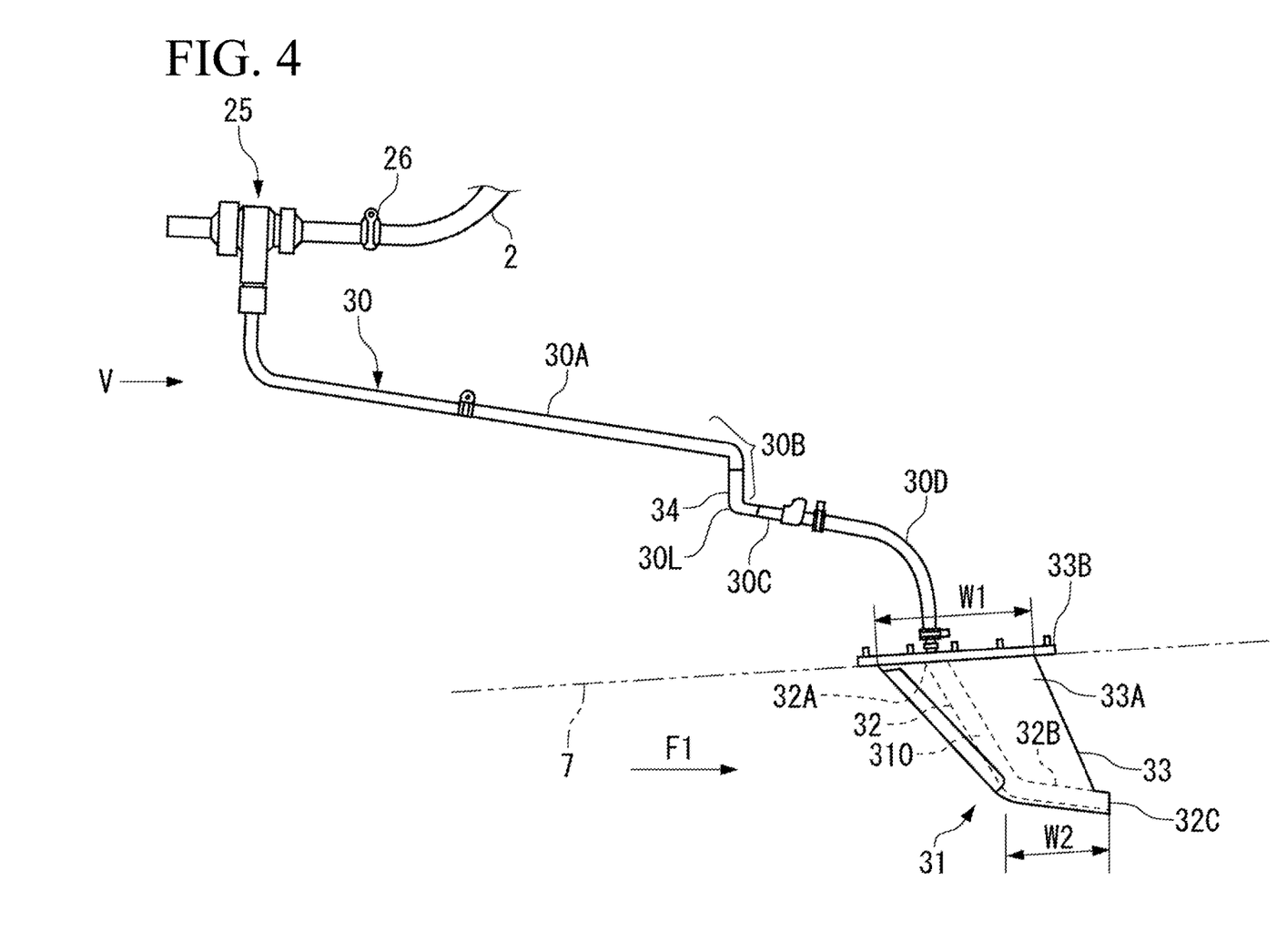
FIG. 4 is a diagram illustrating a drain pipe.

The fuel pipe 2 is supported to an unillustrated beam and the like that are provided in each of the pressurized section 5A and the non-pressurized section 5B, by a bracket and a clamp 26 (FIG. 4).

Figure 2A:
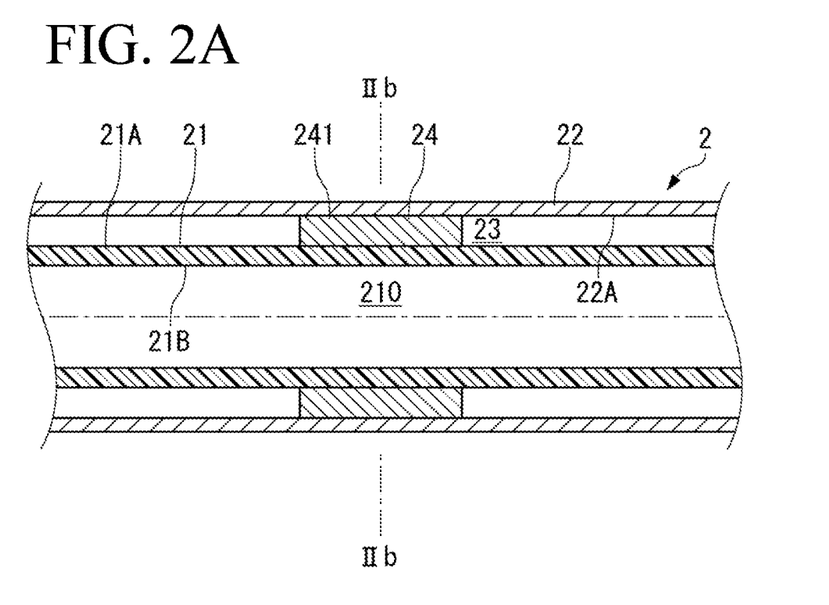
FIG. 2A is a vertical cross-sectional diagram of the fuel pipe illustrated in FIG. 1.
Figure 2B:
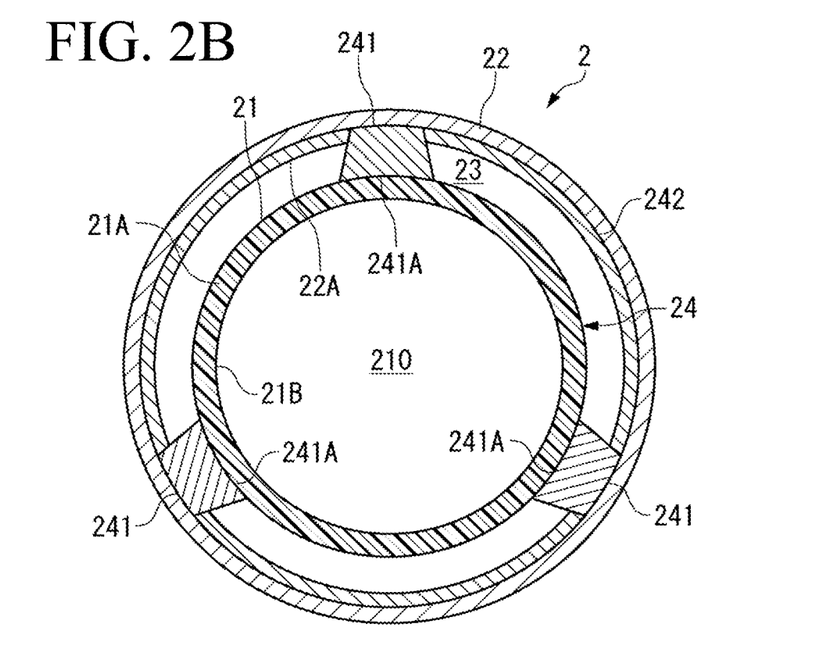
FIG. 2B is a cross-sectional diagram taken along line IIb-IIb of FIG. 2A.

As illustrated in FIGS. 2A and 2B, the fuel pipe 2 includes an inner pipe 21 and an outer pipe 22. The inner pipe 21 defines a flow path 210 through which the fuel flows, and the outer pipe 22 surrounds an outer periphery of the inner pipe 21. In other words, the fuel pipe 2 has a double pipe structure including the inner pipe 21 and the outer pipe 22. Although detailed illustration is omitted, the fuel pipe 2 is divided into a plurality of parts, and includes a plurality of partial pipes corresponding to the respective parts, and fittings that connect the partial pipes to one another. Each of the partial pipes has the double pipe structure.

As illustrated in FIG. 2B, the inner pipe 21 and the outer pipe 22 that each have a circular cross-sectional surface are disposed such that respective axial lines (illustrated by an alternate long and short dash line in FIG. 2A) are coincident with each other.

An annular gap 23 is provided between an outer periphery 21A of the inner pipe 21 and an inner periphery 22A of the outer pipe 22. A size (a width) of the gap 23 in a radial direction is fixed by a spacer 24 over the entire circumference of the inner pipe 21 and the outer pipe 22. The spacer 24 is disposed in the gap 23.

The spacer 24 may be made of a metal material such as an aluminum alloy.

The spacer 24 includes a plurality of (three in this case) thick portions 241 and an annular thin portion 242, and is formed in an annular shape as a whole. Each of the thick portions 241 has a size corresponding to the width of the gap 23, and the thin portion 242 couples the thick portions 241 to one another. The thick portions 241 are disposed at substantially equal angles with respect to an axial center of the spacer 24, but the space of the gap 23 is continuous in a length direction of the inner pipe 21 and the outer pipe 22.

Each of the thick portions 241 is formed to have the size in the circumferential direction that is gradually decreased toward the outside in the radial direction. The thin portion 242 couples the thick portions 241 to one another on the outer peripheral side.

The spacer 24 is inserted into the inside of the outer pipe 22 and is fitted to the inner periphery 22A of the outer pipe 22. Inserting the inner pipe 21 into an inner periphery of the spacer 24 that is thus integrated to the outer pipe 22 and fitting the inner pipe 21 to respective inner peripheral ends 241A in the radial direction of the plurality of thick portions 241 allows for assembly of the fuel pipe 2.

The fuel pipe 2 according to the present embodiment has the double pipe structure over the entire length from the rear spar 3A to the auxiliary power unit 1.

The gap 23 that is an air layer is provided between the inner pipe 21 and the outer pipe 22. Therefore, heat insulation effect by the air layer makes it possible to additionally suppress heat transfer quantity between the circumference of the outer pipe 22 and the inside of the inner pipe 21 over the entire length of the fuel pipe 2.

The gap 23 is continuous in the length direction of the fuel pipe 2, and a plurality of spacers 24 are disposed with intervals in the length direction of the fuel pipe 2.

The intervals and respective lengths of the spacers 24 are determined to maintain a constant width of the gap 23 over the entire length of the fuel pipe 2. The constant width of the gap 23 allows for exertion of the predetermined additional heat insulation performance.

The inner pipe 21 and the outer pipe 22 that configure the double pipe are made of materials different from each other.

The outer pipe 22 is made of a metal material such as an aluminum alloy.

The inner pipe 21 is made of a rubber material.

The inner pipe 21 and the outer pipe 22 require corrosion resistance against the fuel of the aircraft, and strength under environmental temperature from extremely low temperature to high temperature (for example, −50° C. to 50° C.)

The rubber material configuring the inner pipe 21 is determined in consideration of required various characteristics and aging characteristics.

Examples of the rubber material suitable for the inner pipe 21 may include thermoplastic polyether ester elastomer. The thermoplastic polyether ester elastomer is excellent in formability, which results in favorable shape accuracy of the inner pipe 21.

As the characteristics common to the rubber materials configuring the inner pipe 21, thermal conductivity is equal to or lower than about 1 W/m·K.

Even if the fuel inside the flow path 210 is leaked to the outside of the inner pipe 21 from a connection between the partial pipes configuring the inner pipe 21 or other parts, the fuel is received by the outer pipe 22.

Figure 3:
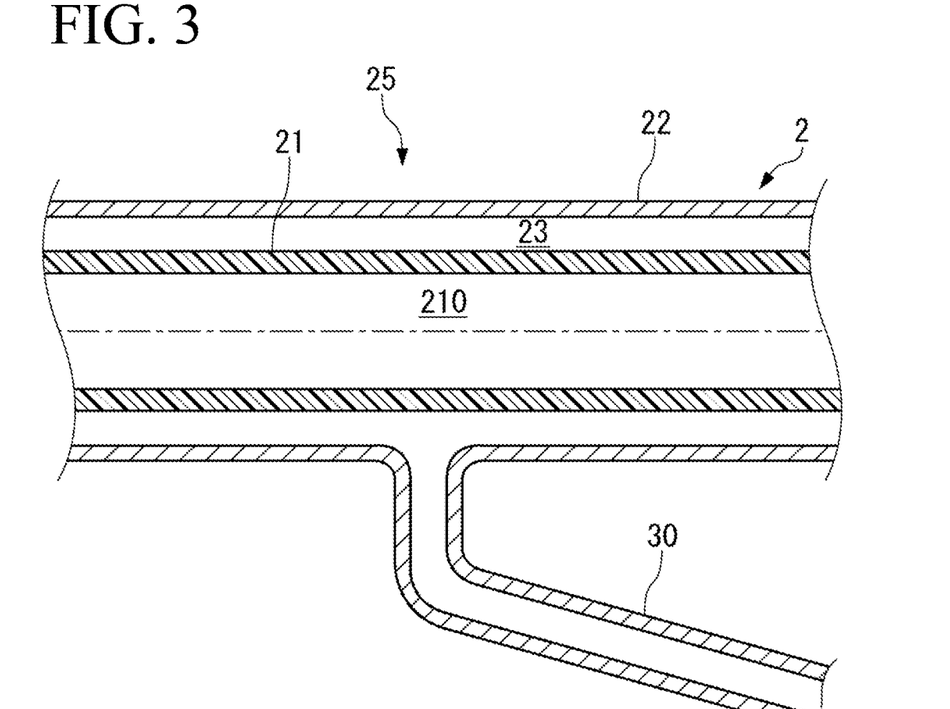
FIG. 3 is an enlarged view of a portion III in FIG. 1.

FIG. 3 is a diagram schematically illustrating the drain connection site 25 of the fuel pipe 2 at which the drain pipe 30 is connected. The gap 23 between the inner pipe 21 and the outer pipe 22 communicates with the inside of the drain pipe 30 at the drain connection site 25 that is the lowest site of the fuel pipe 2. Therefore, the fuel leaked to the gap 23 at any position in the longitudinal direction of the flow path 210 flows through the gap 23 between the thick portions 241 (FIG. 2B) of the spacer 24 to the drain connection site 25, and is then discharged to the outside of the aircraft through the drain pipe 30. In other words, the gap 23 also functions as a discharge flow path of the fuel.

As illustrated in FIG. 4, the drain pipe 30 is arranged rearward from the drain connection site 25. The drain pipe 30 is slanted downward over the entire length. The drain pipe 30 includes a plurality of partial pipes and fittings that connect the partial pipes to one another.

The drain pipe 30 includes: a rearward extending part 30A that extends rearward; a crank part 30B that is bent in a crank shape with respect to the rearward extending part 30A; a right-pointing part 30C (FIG. 5) that extends rightward continuously from the crank part 30B; a down-pointing part 30D that extends downward from the right-pointing part 30C; and a discharge part 31 that is continuous to a lower end of the down-pointing part 30D and projects from a lower side of the aircraft to the outside.

Figure 5:
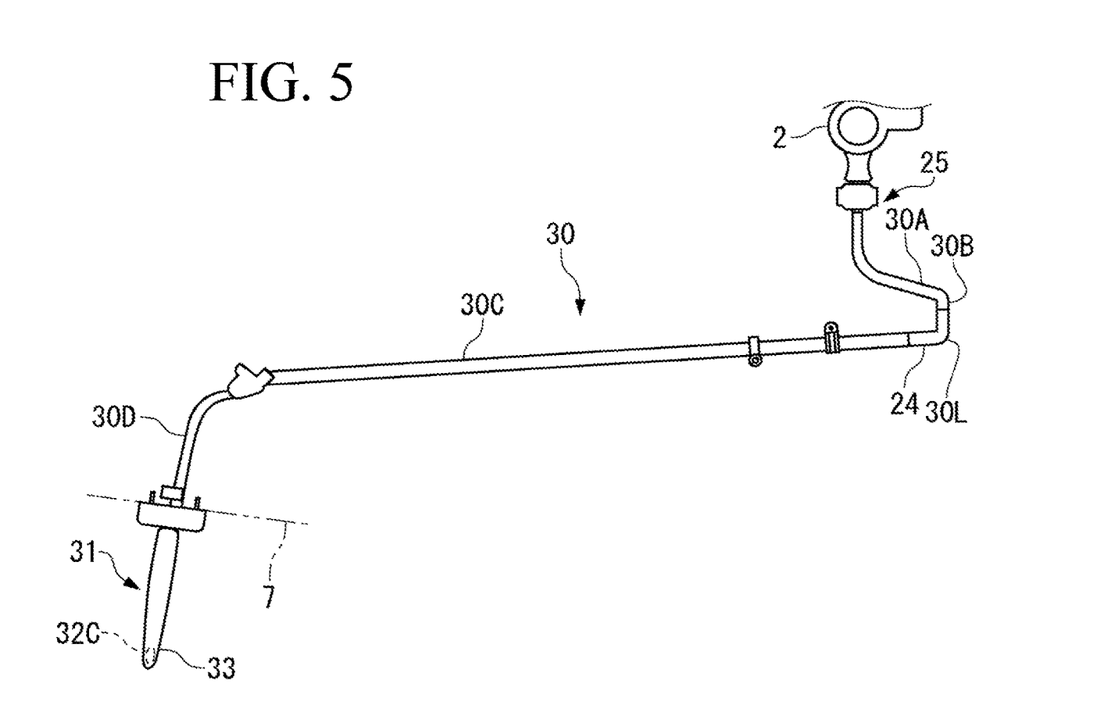
FIG. 5 is a diagram illustrating the drain pipe as viewed from a direction of arrow V in FIG. 4.

Alternate long and two short dashes lines illustrated in FIG. 4 and FIG. 5 each indicate a contour of a fairing 7 that is provided on the lower part of the fuselage 4.

In the present specification, the outside of the airframe including the main wing 3, the fuselage 4, and the fairing 7 is referred to as outside of the aircraft.

As illustrated in FIG. 4, the discharge part 31 includes a discharge pipe 32 and a drain fin 33. The discharge pipe 32 defines a discharge path 310 through which the fuel flows, and the drain fin 33 covers the discharge pipe 32. The discharge part 31 wholly projects downward in a ventral fin shape from the fairing 7.

The discharge pipe 32 and the drain fin 33 are each made of an aluminum alloy or a fiber reinforced resin, and are assembled.

An upper end part of the drain fin 33 is fastened by an attaching member 33B inside the fairing 7, which causes the discharge part 31 to be supported by the fairing 7.

The discharge pipe 32 includes an upper end part 32A and a lower end part 32B. The upper end part 32A is connected to the down-pointing part 30D inside the fairing 7, and the lower end part 32B is located below the upper end part 32A and on the rear side of the upper end part 32A. A discharge port 32C that opens rearward is provided at an end of the lower end part 32B.

The fuel that has flown into the drain pipe 30 from the gap 23 is discharged rearward from the discharge port 32C of the discharge part 31 outside the aircraft. Since the discharge port 32C opens along a direction of airflow F1 around the aircraft during flight, pressure is negative in the vicinity of the discharge port 32C, which makes it possible to smoothly discharge the fuel along the airflow F1 without retaining the fuel in the discharge pipe 32.

The drain fin 33 covers the entire discharge pipe 32 and is disposed substantially parallel to the airflow during flight, thereby reducing air resistance caused by the discharge part 31 projecting to the outside of the aircraft. The drain fin 33 includes a pair of panels 33A sandwiching the discharge pipe 32 in between. The panels 33A extend from respective positions in front of the discharge pipe 32 to respective positions at the end of the discharge pipe 32 through both right and left sides of the discharge pipe 32. The discharge pipe 32 is moderately curved inside the drain fin 33.

In the drain fin 33, an upper end has a width W1 in the front-rear direction, and a lower end has a width W2 in the front-rear direction that is smaller than the width W1. In addition, the drain fin 33 is wholly inclined such that the lower end is located on the rear side of the upper end. Further, the lower end on the front side of the drain fin 33 has a smooth shape without a corner, and the discharge port 32C is located at the lower end on the rear side.

Since the discharge pipe 32 is covered with the drain fin 33, it is possible to avoid the airflow F1 around the aircraft from being disturbed by the discharge part 31 that projects from the aircraft to the outside of the aircraft. This contributes to smooth discharge of the fuel from the discharge port 32C along the airflow F1.

The drain pipe 30 is influenced by temperature variation of the outside air because the drain pipe 30 is disposed in the fairing 7 that is exposed to the outside air. To prevent excessive stress caused by the temperature variation of the drain pipe 30 from being applied to a bent part 30L (FIG. 4) that is bent in the drain pipe 30, the bent part 30L and the vicinity thereof (the front side and the rear side thereof) may be preferably configured of a rubber tube 34 that absorbs thermal expansion and contraction. The bent part 30L is a portion of the crank part 30B, and has the smallest radius of curvature in the drain pipe 30. Difference of thermal expansion between a front section and a rear section of the bent part 30L is absorbed by elastic deformation of the rubber tube 34.

The significance of configuring the fuel pipe 2 according to the present embodiment into the double pipe structure that includes the inner pipe 21 and the outer pipe 22 is described now.

First, it is possible to obtain additional heat insulation effect by the gap 23 (the air layer) between the inner pipe 21 and the outer pipe 22. In addition, the heat insulation function by the inner pipe 21 that is made of a rubber material lower in thermal conductivity than an aluminum alloy works, which makes it possible to suppress variation of the fuel temperature in the inner pipe 21 caused by variation of the outside temperature and to maintain the temperature of the fuel within appropriate temperature range. The airframe is exposed to the outside air below freezing during flight at high altitudes. Although the fuel pipe 2 is disposed inside the aircraft, a space in which the fuel pipe 2 is disposed is cooled by cold outside air through a skin of the fuselage 4, particularly in the non-pressurized section 5B in which air conditioning is not performed. It is possible, however, to suppress temperature decrease of the fuel in the flow path 210 by the heat insulation effect by the inner pipe 21 made of the rubber material, which allows for suppression of coagulation of moisture in the fuel and icing on the inner periphery 21B of the inner pipe 21.

The heat insulation effect by the double pipe structure that includes the inner pipe 21 made of the rubber material and the outer pipe 22 makes it possible to avoid accumulation of ice on an inner wall of the flow path 210 (the inner periphery 21B of the inner pipe 21) even if moisture in the fuel flowing through the flow path 210 is coagulated and icing occurs on the inner wall of the flow path 210. Therefore, it is possible to prevent block of the flow path 210 by the ice.

As mentioned above, the double pipe structure of the inner pipe 21 and the outer pipe 22 has the significance in sure securement of the fuel supply to the auxiliary power unit 1.

To obtain the additional heat insulation effect by the gap 23, it is important to maintain the predetermined size of the gap 23.

According to the present embodiment, deflection of the inner pipe 21 made of the rubber material is corrected by the spacer 24 and the outer pipe 22 that are each made of the metal material. This makes it possible to maintain the predetermined size of the gap 23 and to sufficiently obtain the additional heat insulation effect.

Incidentally, the double pipe structure that includes the inner pipe 21 made of the rubber material and the outer pipe 22 made of the metal material contributes to redundancy securement in emergency.

For example, even if impact is applied to the fuel pipe 2 at the time of belly landing, the outer pipe 22 made of the metal material is deformed and broken so as to absorb energy of the impact. This makes it possible to avoid breakage of the inner pipe 21. At this time, even if the outer pipe 22 is broken, the fuel is retained inside the inner pipe 21 because the inner pipe 21 is not broken. The inner pipe 21 made of the rubber material is elastically deformed to absorb vibration while the vibration is applied subsequent to the impact. As a result, the fuel is retained inside the inner pipe 21.

In contrast to the present embodiment, if the outer pipe 22 is made of the rubber material and the inner pipe 21 is made of the metal material, the energy of the impact is not wholly absorbed by the outer pipe 22 and the inner pipe 21 is accordingly broken, which causes the fuel to be leaked from the broken point through the gap 23 and the drain pipe 30.

Since the fuel pipe 2 that supplies the fuel to the auxiliary power unit 1 is provided at the lower part of the fuselage 4, it is possible to retain the fuel in a portion that is high in necessity for measures against belly landing as much as possible, namely, in the fuel pipe 2 in the present embodiment, and to prevent fire in emergency.

The outer pipe 22 made of the metal material absorbs the energy of the impact to prevent transmission of the energy to the inner pipe 21, which contributes to protection of the inner pipe 21 from external force that may affect the fuel pipe 2 in maintenance or a case except for emergency. For example, even if tools, jigs, and the like used for maintenance are hit against the outer pipe 22 and the outer pipe 22 is accordingly broken, it is possible to protect the inner pipe 21 against breakage.

In addition, configuring the inner pipe 21 with use of the rubber material and configuring the outer pipe 22 with use of the metal material contributes to suppression of the weight of the fuel pipe 2.

The pipe made of the rubber material is typically larger in thickness and weight than the pipe made of the metal material. Therefore, configuring, with use of the rubber material, the inner pipe 21 having a smaller diameter, out of the inner pipe 21 and the outer pipe 22, makes it possible to perform measures at the time of belly landing as mentioned above while suppressing weight increase due to the double pipe structure of the fuel pipe 2.

Figure 6:
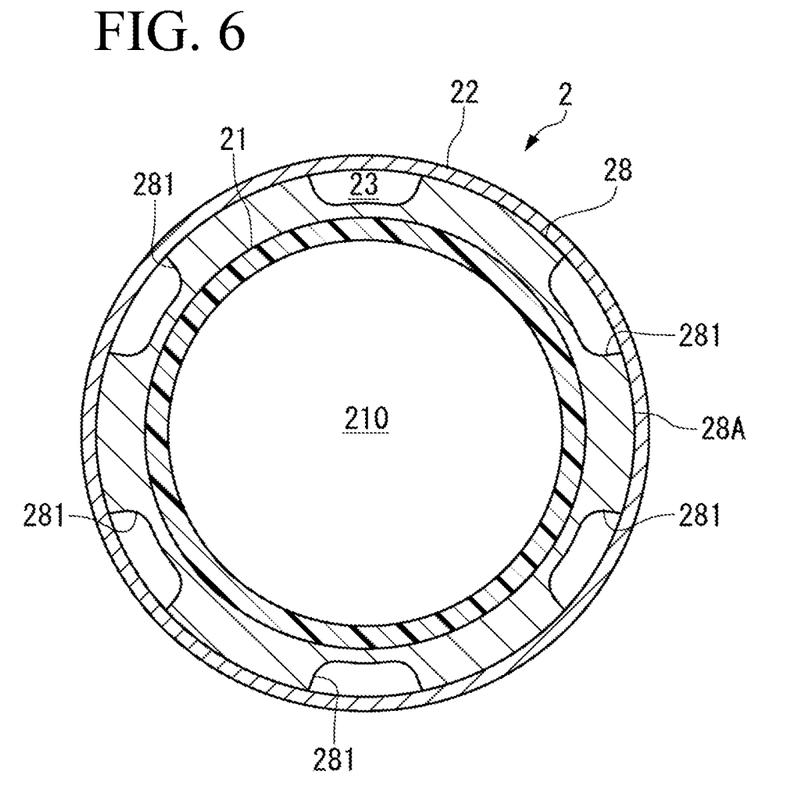
FIG. 6 is a diagram illustrating an example of another spacer.

FIG. 6 is a diagram illustrating an annular spacer 28 that is disposed in the gap 23 between the inner pipe 21 and the outer pipe 22, in place of the spacer 24 illustrated in FIG. 2B. A plurality of spacers 28 are disposed with intervals in the length direction of the fuel pipe 2.

An outer periphery 28A of each of the spacers 28 is provided with a plurality of grooves 281 that are each recessed in a thickness direction of the spacer 28. The grooves 281 are arranged at substantially equal angles with respect to an axial center of the spacer 28 and function as flow paths through which the fuel flows.

Note that the grooves 281 may be provided in an inner periphery of the spacer 28.

An area of the cross-sectional surface of the spacer 28 is larger than a total area of the flow paths that are insides of the respective grooves 281. The spacer 28 has the area of the cross-sectional surface larger than that of the spacer 24 in FIG. 2B. The spacer 28 makes it possible to provide larger resistance to the flow of the air in the gap 23 in the pipe length direction, as compared with the case in which the spacer 24 is used.

When the spacer 28 is disposed in the gap 23, heat transmission (convection) with the air flow as a medium is suppressed and the heat of the fuel in the flow path 210 is prevented from being dissipated to the gap 23 through the wall of the inner pipe 21. This makes it possible to improve heat insulation performance. Therefore, it is possible to further suppress generation of ice in the fuel and icing on the inner wall of the inner pipe 21.

Other than the above description, the configurations described in the above-described embodiment may be selected or may be appropriately modified without departing from the scope of the present invention.

In the present invention, the respective materials configuring the inner pipe 21 and the outer pipe 22 are not limited in an aspect that the fuel leaked from any position of the fuel pipe 2 is discharged to the outside of the aircraft through the drain pipe 30. In other words, a configuration in which both the inner pipe 21 and the outer pipe 22 are made of the aluminum alloy and the gap 23 between the inner pipe 21 and the outer pipe 22 communicates with the inside of the drain pipe 30 is also included in the present invention. The inner pipe 21 may be made of the aluminum alloy, and the outer pipe 22 may be made of the rubber material. The present invention makes it possible to provide additional heat insulation effect by the air layer and to discharge the leaked fuel without retaining the leaked fuel in the gap 23 of the fuel pipe, irrespective of the materials of the inner pipe 21 and the outer pipe 22.

The heat insulation performance of the fuel pipe 2 of the present invention is dominated by the rubber material that is used for the inner pipe 21 and has low thermal conductivity. The heat insulation performance, however, may be additionally improved by increasing the width of the gap 23 between the inner pipe 21 and the outer pipe 22 depending on condition.

Further, the fuel pipe 2 does not necessarily have the double pipe structure over the entire length. The double pipe structure including the inner pipe 21 and the outer pipe 22 may be adopted only to a section highly requiring heat insulation, and a single pipe structure including only the inner pipe 21 may be adopted to other sections, based on the temperature condition. This allows for weight reduction of the fuel pipe 2.

The drain fin 33 of the discharge part 31 of the drain pipe 30 is provided separately from the fairing 7 in the above-described embodiment; however, the drain fin 33 may configure an aerodynamic fairing as a portion of the fairing 7.

In the above-described embodiment, the discharge pipe 32 that defines the discharge path 310 of the fuel and the drain fin 33 are assembled to configure the discharge part 31. The configuration, however, is not limited thereto, and integral forming of the aerodynamic fairing including the discharge path 310 may result in the discharge part 31.

Further, in the above-described embodiment, the drain pipe 30 is connected only to the drain connection site 25 that is the lowest site in the path of the fuel pipe 2. The drain pipe, however, may be connected to a site that is separated from the drain connection site 25 and is located higher than the drain connection site 25, in addition to the drain connection site 25.

An object to which the fuel is supplied by the fuel pipe according to the present invention is not limited to the auxiliary power unit and may be an engine. The engine may be supported by the main wing 3 or supported by a rear part of the airframe (including the vicinity of the tail wing).

What is claimed is:

1. A fuel pipe provided in an airframe of an aircraft, the fuel pipe comprising:
   an inner pipe defining a flow path through which fuel flows; and
   an outer pipe surrounding an outer periphery of the inner pipe, wherein
   a gap is provided between the outer periphery of the inner pipe and an inner periphery of the outer pipe, and the gap is continuous in a length direction of the fuel pipe and communicates with inside of a drain pipe that discharges the fuel to outside of the aircraft.

2. The fuel pipe of the aircraft according to claim 1, wherein the drain pipe includes a discharge part that discharges the fuel rearward outside the aircraft.

3. The fuel pipe of the aircraft according to claim 2, wherein the discharge part includes a discharge path through which the fuel flows, and an aerodynamic fairing that covers the discharge path.

4. The fuel pipe of the aircraft according to claim 3, wherein the discharge path and the aerodynamic fairing wholly project, in a ventral fin shape, from a lower part of the airframe to the outside of the aircraft.

5. The fuel pipe of the aircraft according to claim 2, wherein a bent part of the drain pipe and a vicinity of the bent part are made of a rubber material.

6. The fuel pipe of the aircraft according to claim 1, wherein a bent part of the drain pipe and a vicinity of the bent part are made of a rubber material.

7. The fuel pipe of the aircraft according to claim 1, wherein an annular member is provided between the outer periphery of the inner pipe and the inner periphery of the outer pipe, the annular member maintaining a predetermined size of the gap and allowing passage of the fuel.

8. The fuel pipe of the aircraft according to claim 1, wherein the drain pipe is configured to be oriented downward over its entire length.

9. The fuel pipe of the aircraft according to claim 1, wherein the gap communicates with the inside of the drain pipe at a lowest site of the fuel pipe.

10. A fuel pipe provided in an airframe of an aircraft, the fuel pipe comprising:
    an inner pipe defining a flow path through which fuel flows, the inner pipe being made of a rubber material; and
    an outer pipe surrounding an outer periphery of the inner pipe, the outer pipe being made of a metal material, wherein
    a gap is provided between the outer periphery of the inner pipe and an inner periphery of the outer pipe, and the gap is continuous in a length direction of the fuel pipe and communicates with inside of a drain pipe that discharges the fuel to outside of the aircraft.

11. An aircraft, comprising:
    the fuel pipe according to claim 1; and
    a fuel supply destination supplied with the fuel through the fuel pipe.

12. The aircraft according to claim 11, wherein the fuel supply destination is an Auxiliary Power Unit.

13. An aircraft, comprising:
    the fuel pipe according to claim 10; and
    a fuel supply destination supplied with the fuel through the fuel pipe.

14. The aircraft according to claim 13, wherein the fuel supply destination is an Auxiliary Power Unit.

* * * * *